Dec. 21, 1954  H. M. BROWN  2,697,590
COMBINED PIE CRUST CUTTER AND WATER DISPENSER
Filed Jan. 23, 1953
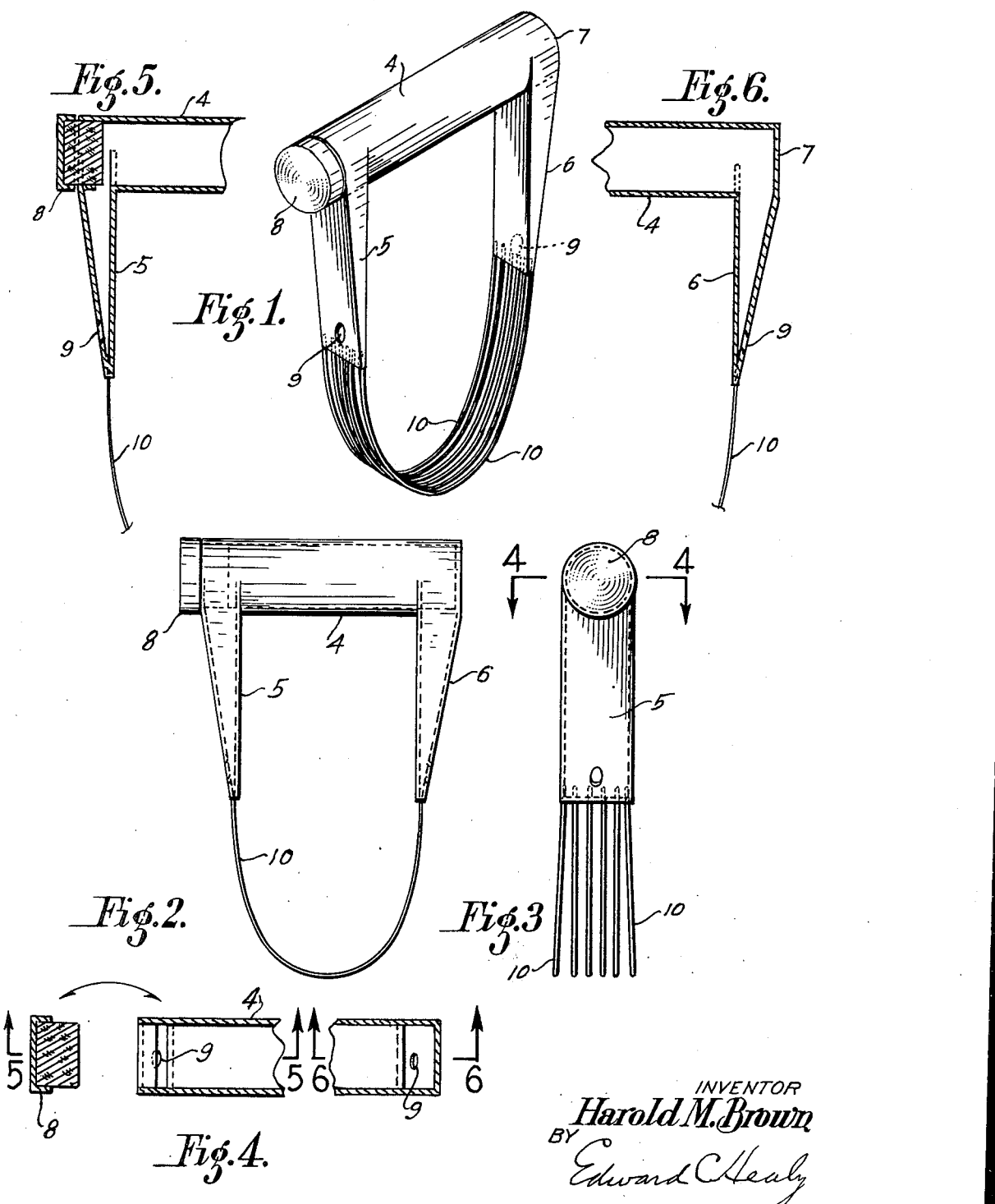
INVENTOR
Harold M. Brown
BY
Edward C. Healy
ATTORNEY

2,697,590

Patented Dec. 21, 1954

2,697,590

COMBINED PIE CRUST CUTTER AND WATER DISPENSER

Harold M. Brown, Redwood City, Calif.

Application January 23, 1953, Serial No. 332,837

1 Claim. (Cl. 259—144)

This invention relates to improvements in culinary devices and has particular reference to a combined cutter and a water dispenser for preparing pie crust.

The principal object of the invention is to utilize a source of water supply in the tubular handle of the cutter and to employ a water dripping means in the handle and side arms thereof, whereby the liquid is continuously fed to the flour and shortening during the mixing of these ingredients to thereby produce a most palatable pie crust wherein sogginess is effectively eliminated.

A further object of the invention is the provision of detachable means associated with the handle to permit the filling and re-filling of this water holding reservoir, as desired.

A further object of the invention is the production of an appliance of the character described that is simple in construction, economical to manufacture, strong, durable, positive in operation and highly efficient and serviceable in use.

Other objects and advantages will be apparent during the course of the following description.

In the accompanying drawings forming a part of this specification and in which like numerals are employed to designate like parts throughout the same, Fig. 1 is a perspective view of the device constructed in accordance with my invention;

Fig. 2 is a side elevational view of the same,

Fig. 3 is an end elevational view of the invention, and

Fig. 4 is a longitudinal section through the device.

Fig. 5 is a vertical sectional view, disclosing to advantage the closure member, the view being taken on the line 5—5 of Fig. 4, and Fig. 6 is a vertical sectional view on the line 6—6 of Fig. 4.

In preparing pie crust for the making of pies it is the customary procedure to mix shortening with flour and then add a supply of water, while resorting to a cutting action or a mixing action of the flour and shortening. Frequently the added water is deposited in one spot, or is in excess of the amount necessary, and there results an undesirable sogginess in the prepared pie crust. To overcome this difficulty and to have at hand and embodied in the implement the desired supply of water that will gradually drip to the ingredients, I have devised the present invention.

Referring to the drawing, the numeral 4 indicates a tubular handle equipped with a pair of slotted or recessed vertical side arms 5 and 6. It will be noted that one end of the handle is closed, as at 7, while the opposite end is open for the reception therein, of a closure member 8, such as a detachable cork that serves to seal the opening when a supply of water has been placed in the handle. Each of the side arms is apertured, adjacent its lower end, as at 9, to provide outlets for the water. Connected to the respective lower ends of said arms are a plurality of spaced substantially semi-circular cutting wires 10 that serve as a media for cutting and mixing the flour, shortening and water that comprise the uncooked ingredients of pie crust, prior to baking the pie.

It is the salient feature of my invention to convey water in drip form to the cutting ends of the wires, and this expediency is accomplished by the flow of water from the handle, to the recessed side arms and then through the apertures 9 to the surfaces of the wires.

It will be obvious that during the cutting and mixing of the flour and shortening, when the implement is held in a vertical or upright position, a limited amount of water will continuously flow, by gravity, to the cutting surfaces of the wires. There will thus result a thorough commingling of the ingredients and danger of sogginess in the pie crust will be reduced to a minimum.

It is to be understood that the form of my invention herewith shown and described is to be taken as a preferred example of the same and that various changes relative to the shape, size, material and arrangement of parts may be readily resorted to without departing from the spirit of the invention or the scope of the subjoined claim.

Having thus described my invention, I claim:

A device of the character described comprising a tubular handle for holding a supply of water therein, a pair of side arms depending from each end of said handle, said arms being hollow and communicating with said handle, each of said arms being apertured adjacent its lower sealed extremity, the apertures adapted to convey water passing from the handle and arms to points exteriorly of the side arms, and a plurality of spaced curved cutting wires fixed at their upper ends to the lower extremities of said arms, the wires capable of receiving thereon the water passing through and dripping from the apertured side arms.

References Cited in the file of this patent

UNITED STATES PATENTS

| Number | Name | Date |
|---|---|---|
| 243,098 | Becker et al. | June 21, 1881 |
| 1,542,574 | Park et al. | June 16, 1925 |
| 1,902,525 | Rowley | Mar. 21, 1933 |